Feb. 8, 1966  J. DREEBEN  3,234,072
FORMING AND SEALING PACKAGES
Filed June 27, 1962
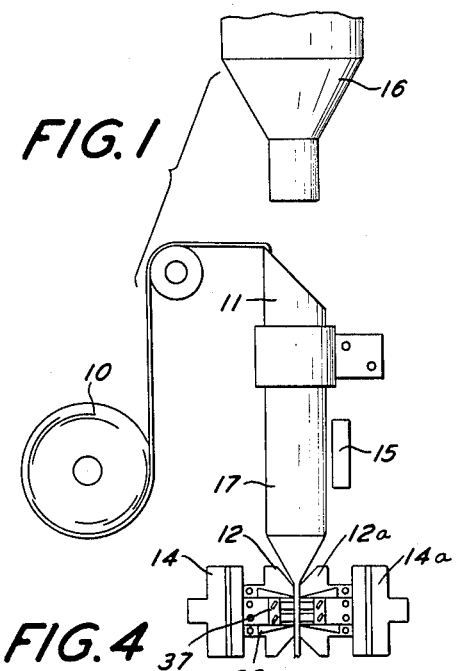
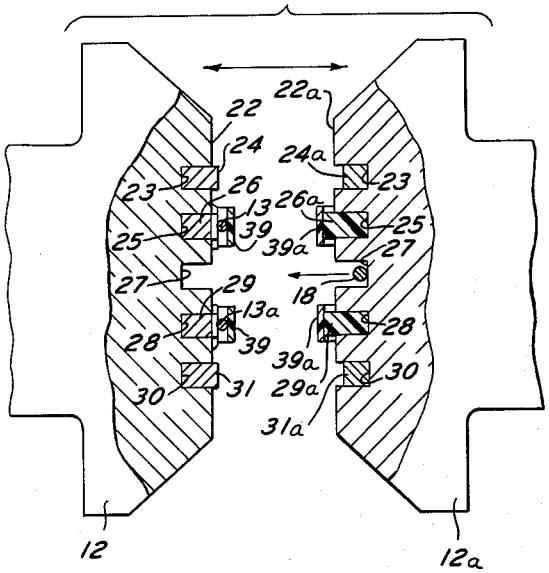
INVENTOR.
JACK DREEBEN
BY B.T. Wobensmith
ATTORNEY

United States Patent Office

3,234,072
Patented Feb. 8, 1966

3,234,072
FORMING AND SEALING PACKAGES
Jack Dreeben, % Mercury Heat Sealing Equipment Co.,
2601 N. Howard St., Philadelphia 23, Pa.
Filed June 27, 1962, Ser. No. 205,589
1 Claim. (Cl. 156—498)

This invention relates to forming and filling packages and apparatus therefor.

It has heretofore been proposed to draw transparent synthetic plastic sheet material from a web roll, form the web about a tube into a bag or envelope and apply a longitudinal seal along the web, fill the bag or envelope through the tube, seal the top of one package with simultaneous sealing of the bottom of the succeeding package and sever the seal intermediate its top and bottom edges to separate the packages, this all being effected in a timed sequence.

Problems have arisen with the sealing jaws, and particularly the back-up strips or bars in front of which the electrical resistance heating elements are disposed. These back-up strips or bars have customarily been made of a non-metallic heat resistant material which is also an electric insulator. One material which has been employed is known as "Transite."

In an effort to increase the permissible speed of operation without adherence to the packaging material while still effecting a satisfactory seal it has been proposed to provide cooling fluid flow in the jaws, or other provisions for cooling. The results, however, have not justified the additional complication of structure.

In accordance with the present invention an improved transverse heat sealing jaw is provided which does not require any cooling provisions but with which an exceedingly high speed of sealing operations can be effected.

In accordance with the present invention, also, the supply of electrical energy for heating the resistance heating elements of the heat sealing jaws is positively shut off upon initiation of the closing of the heat sealing jaws.

In accordance with the invention, also, an improved heat sealing jaw construction is provided in which the resistance heating element is backed up and pressure directly applied thereagainst by a metallic back-up bar carried by the jaw.

In accordance with the present invention, also, an improved heat sealing jaw construction is provided in which a metallic back-up bar is employed with an electrical resistance heating element, together with jaw position actuated switching means carried by at least one of the jaws for preventing short circuiting of the heating element when it is applying a seal to the package.

Other objects and advantageous features of the invention will be apparent from the description and claim.

The nature and characteristic features of the invention will be more readily understood from the following description taken in connection with the accompanying drawings forming part thereof, in which:

FIGURE 1 is a diagrammatic view of apparatus for forming and filling packages illustrative of the invention;

FIG. 2 is a view in perspective of a pair of transverse sealing jaws illustrative of the invention;

FIG. 3 is a transverse sectional view of the jaws shown in FIG. 2; and

FIG. 4 is a wiring diagram for the jaw carried sealing elements.

It should, of course, be understood that the description and drawings herein are illustrative merely, and that various modifications and changes can be made in the structure disclosed without departing from the spirit of the invention.

Like numerals refer to like parts throughout the several views.

It has heretofore been proposed to provide package making machines which include a web roll 10 as shown in FIG. 1 having thereon a supply of sheet material to be made into a succession of longitudinally sealed tubular packages with transverse seals at each end.

The prior package making machines also included a forming shoe 11 to which the sheet material was advanced from the supply on the web roll 10, the advancing being effected by a pair of horizontally separable gripping jaws 12 in engagement with the tubular web. The gripping jaws 12 and 12a customarily provided with heat sealing portions or elements 13 and 13a, such as resistance heating wires, were reciprocated in a vertical path by their supports 14 and 14a, the length of the stroke determining the length of the package. The supports 14 and 14a were separated at the bottom of the stroke and moved upwardly in open position, then closed at the top of their stroke to bring the heat sealing portions 13 and 13a of the jaws 12 and 12a into gripping relation to the tubular conformation of the sheet material provided by the forming shoe 11.

Either during a period of rest or during the downward movement of the web of sheet material a longitudinal seal was provided by a longitudinal heat sealer 15 and the articles were delivered into the tubular formed web from a source of supply 16 through a filling tube 17 interiorly disposed in spaced relation to the forming shoe 11.

During the downward movement of the jaws 12 and 12a, also, a transverse seal was applied to the tubular sheet material which was severed, such as by a heated wire 18 applied intermediate the top and bottom margins of the transversely sealed area. The transverse seal provided a sealed transverse top margin of the filled package and a sealed transverse bottom margin of the package to be filled. Repetition of the operations just referred to provided a succession of filled, sealed and separated packages.

Referring now more particularly to FIGS. 2, 3 and 4 of the drawings, the jaw support 14, at the left of FIGS. 2 and 3 has a jaw 12 mounted and held by bolts 21. The outer or working face 22 of the jaw 12 is provided with an upper horizontal groove 23 in which a transverse outwardly projecting gripper bar 24 is mounted, an upper intermediate horizontal groove 25 in which an upper steel back-up and heat transfer bar 26 is mounted, preferably substantially flush with the face 22, a central groove 27 to provide a location for the reception of the cutter wire 18 upon the horizontal movement thereof for cutting, a lower intermediate groove 28 in which a lower steel back-up and heat transfer bar 29 is mounted, preferably substantially flush with the face 22, and a lower horizontal groove 30 in which a lower transverse outwardly projecting gripper bar 31 is mounted.

The upper and lower heat sealing wires 13 and 13a extend over support plates 32 at each end. The plates 32 can serve as electrical conductors for energizing the wires 13 and 13a and are preferably insulated from the jaw 20 by electrical and thermal insulating blocks 33. End clamps 34 can be provided for holding the ends of the wires 13 and 13a to the support plates 32.

The blocks 33 also have secured thereto strip carrying brackets 35 on which strip holder clamps 37 with adjusting screws 38 are provided at one end for holding the separating strips 39 which extend along the wires 13 and 13a for transfer of heat and separation from the package material after formation of the transverse seal. The strips 39 are secured at their other ends to the bracket 35 in any desired manner. The strips 39 can be made of any desired material but "Teflon" has been found to be particularly suitable as it permits the transfer of heat from the wires 13 and 13a for forming a transverse seal and by reason of its freedom from the tendency to adhere to the packaging material, strips or separates readily from the sealed locations and avoids sticking to the bars 26, 26a, 29 and 29a.

The jaw support 14 at the right of FIGS. 2 and 3 of the drawings has a jaw 12a mounted thereon and held in the same manner as the jaw 12.

The outer or working face 22a of the jaw 12a has an upper horizontal groove 23 in which a transverse inset gripper bar 24a is mounted, an upper intermediate horizontal groove 25 in which an upper outwardly projecting presser bar 26a is mounted, a central horizontal groove 27 for reception of the cutter wire 18 in its retracted position, a lower intermediate horizontal groove 28 in which a lower outwardly projecting presser bar 29a is mounted, and a lower horizontal groove 30 in which a transverse inset gripper bar 31a is mounted.

The cutter wire 18 is carried on electrical insulators, is on a frame 41 which is mounted on screws 42 pivoted at 43 to the jaw 12a so that the wire 18 can be swung from a position in the groove 27 of the jaw 12a into engaging and severing relation to the package material and into the groove 27 in the jaw 12 to the extent desired to effect the severing.

The presser bars 26a and 29a preferably have strips 39a, similar to the strips 39, extending therealong for engagement with the packaging material.

The sealing wires 13 and 13a can be energized in any desired manner for heating, and preferably by electrical energy directly connected or indirectly coupled to their leads 44. The energizing circuit for the heating wires 13 and 13a preferably has included therein a switch 45 carried by the jaw 12 and a shut off actuator 46 carried by the jaw 12a which cuts off the energy supply as the jaws 12 and 12a are brought toward closing position but before the wires 13 and 13a are displaced towards the bars 26 and 29. In this manner, short circuiting of the wires 13 and 13a upon engagement with the bars 26 and 29 is avoided.

In operation, the wires 13 and 13a energized for heating to provide a seal have the energization cut off in a controlled operation when the strips 39a urged by the presser bars 26a and 29a engage the packaging material at the location where the transverse seals are to be formed. The packaging material is urged against the strips 39 and the wires 13 and 13a therebehind and by transfer of heat from the wires 13 and 13a through the strips 39 and 39a, spaced transverse seals are provided in the packaging material. The lower of the transverse seals closes the previously filled package and the upper of the transverse seals provides the bottom for the next package to be filled. The energy cut off to the wires 13 and 13a is affected by the switch 45. A portion of the excess heat is dissipated by engagement of the wires 13 and 13a with the metallic back-up bars 26 and 29, and is transferred to and through the jaws 12 and 12a and thence to the atmosphere.

Very rapid sealing action has been accomplished and at a rate higher than has heretofore been achieved when using heat cooled back-up bars of electrical insulating material.

I claim:

A sealing jaw construction for apparatus for forming packages of heat sealable sheet material comprising an elongated jaw member, a resistance heating member extending along said jaw member, an elongated separating strip extending along said heating member interposed between said heating member and the packaging material for direct contact with the packaging material, an elongated metallic heat transfer and back-up bar mounted on said jaw on the opposite side of said heating member from said separating strip and from which said heating element is normally spaced, mounting members for said heating member for movement of said heating member into engagement with said bar upon the application of pressure on said heating member, and members for interrupting the supply of electrical energy to said heating members prior to engagement of said heating member with said bar, said bar cooling said heating element when said heating element is in engagement therewith.

References Cited by the Examiner

UNITED STATES PATENTS

| | | | |
|---|---|---|---|
| 2,712,343 | 7/1955 | Stanton | 156—583 |
| 2,743,761 | 5/1956 | Snyder et al. | 156—583 |
| 2,751,965 | 6/1956 | Miller. | |
| 2,796,913 | 6/1957 | Fener et al. | |
| 2,899,875 | 8/1959 | Leasure | 53—180 XR |
| 3,047,991 | 8/1962 | Siegel et al. | 53—182 |
| 3,142,602 | 7/1964 | Shabram | 156—583 |

EARL M. BERGERT, *Primary Examiner.*

R. A. LEIGHEY, *Examiner.*